Figure 1:
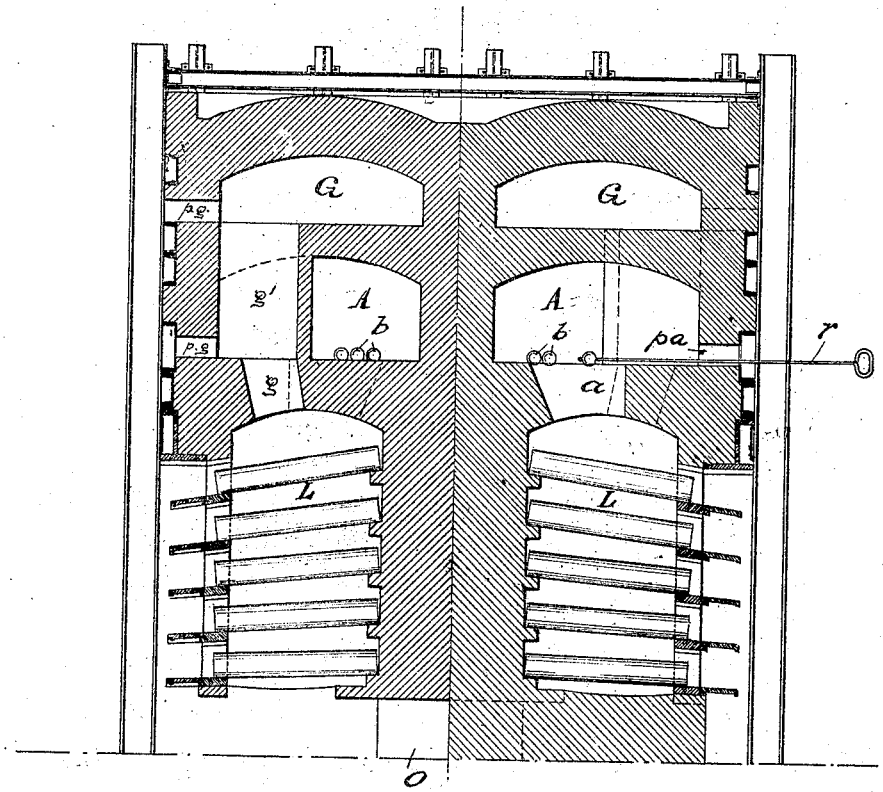

A. FOLLIET.
GAS FURNACE.
APPLICATION FILED JULY 20, 1911.

1,049,569.

Patented Jan. 7, 1913.
4 SHEETS—SHEET 1.

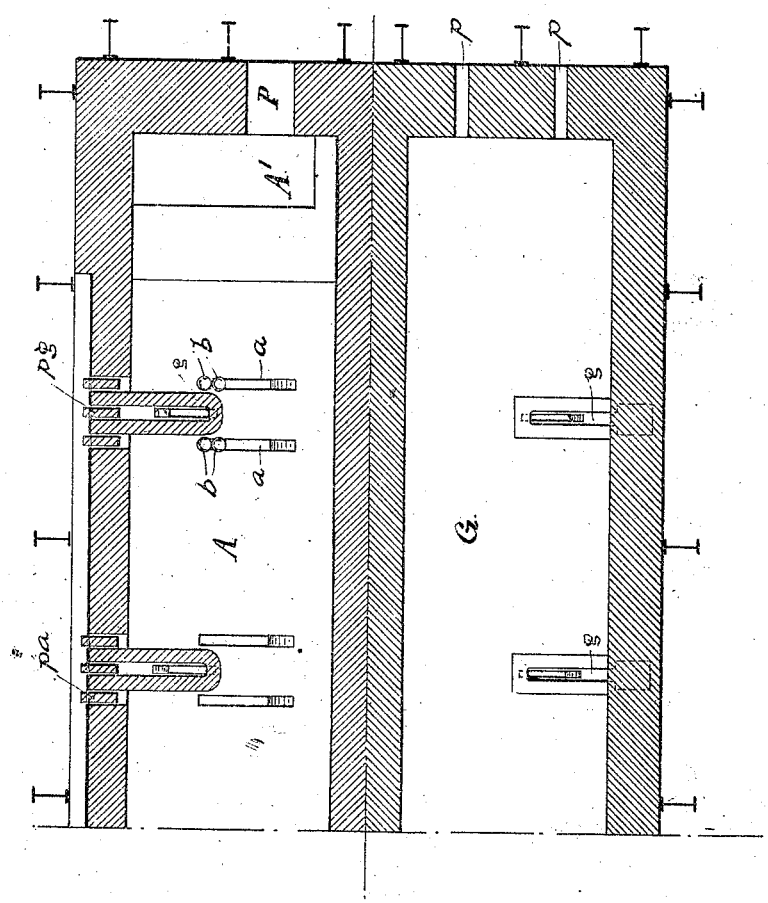

A. FOLLIET.
GAS FURNACE.
APPLICATION FILED JULY 20, 1911.
1,049,569.
Patented Jan. 7, 19
4 SHEETS—SHEET
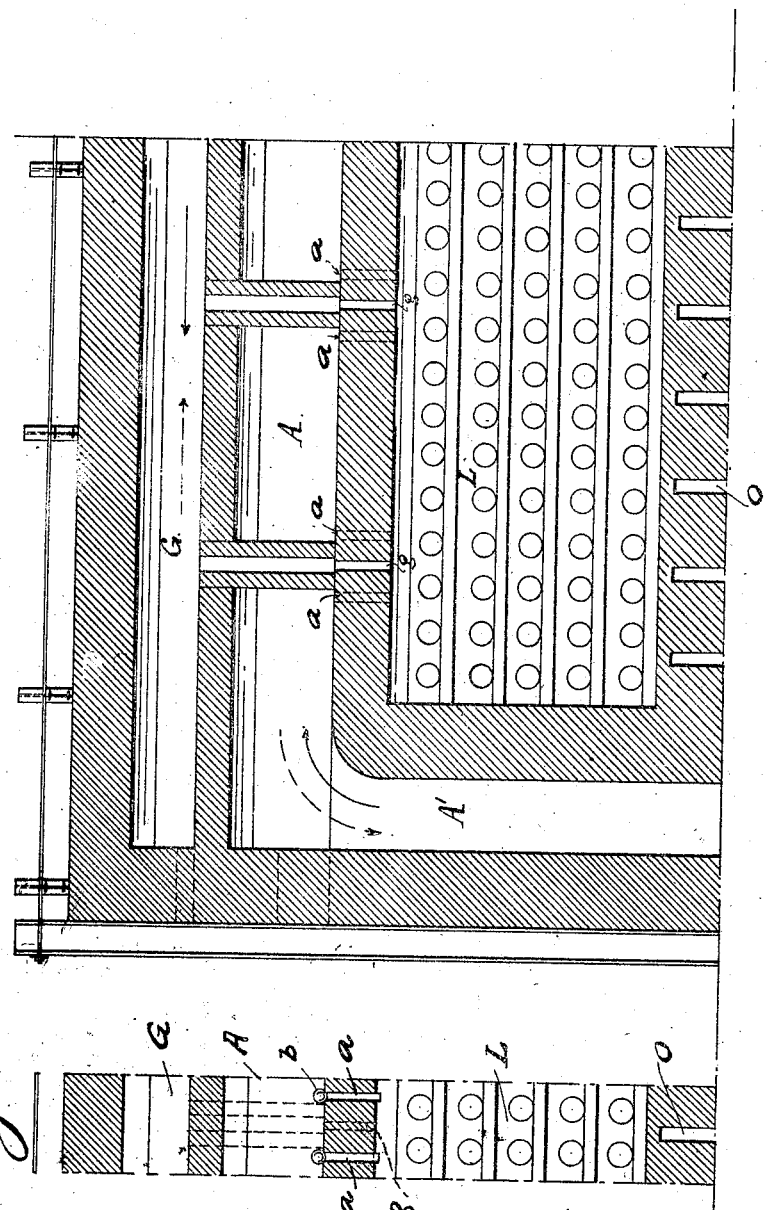
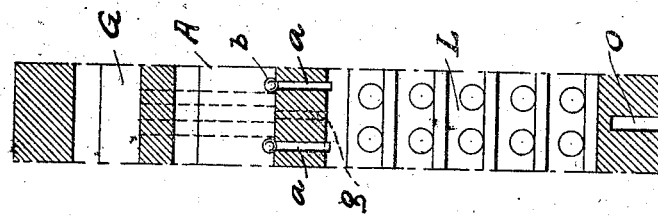
WITNESSES
INVENTOR
BY
ATTORNEY

A. FOLLIET.
GAS FURNACE.
APPLICATION FILED JULY 20, 1911.

1,049,569.

Patented Jan. 7, 1913.
4 SHEETS—SHEET 4.

UNITED STATES PATENT OFFICE.

ALEXANDRE FOLLIET, OF BRUSSELS, BELGIUM.

GAS-FURNACE.

1,049,569.

Specification of Letters Patent. Patented Jan. 7, 1913.

Application filed July 20, 1911. Serial No. 639,500.

*To all whom it may concern:*

Be it known that I, ALEXANDRE FOLLIET, a subject of France, residing at Brussels, Belgium, have invented certain new and useful Improvements in Gas-Furnaces, of which the following is a specification.

This invention relates to gas furnaces, either with or without regenerators, and more particularly to a special construction of means for introducing the combustible gas and air for combustion into the combustion chamber or hearth of the furnace.

The novel construction is especially designed for gas furnaces where the distribution of the heat must be very uniform, both in the horizontal and in the vertical sense, even when the length of the hearth or combustion chamber is relatively great and although the conductivity of the body or materials subject to the action of the heat cannot be counted on to assist effectively in the uniform distribution of the same. Such is, for example, the case in zinc furnaces (muffle furnaces or retort furnaces), in glass furnaces (pot furnaces) and furnaces for calcination or burning of refractory materials or products, etc.

The object of the invention is to improve in a very material degree the manner of mixing the gas and air and conducting the combustion, with a view to avoiding darts of flame, explosions, or other inequalities of combustion, securing maximum utilization of the calorific value of the gas, and the general improvement in the operation of the furnace and economy in consumption of retorts, etc.

In accordance with this invention, means are provided for introducing the gas and air, through separate, narrow, adjacent slits, constructed and arranged to cause the air and gas to enter the combustion chamber in the form of thin vertically-directed streams or "slices", parallel and adjacent to each other, which streams or "slices" travel and mingle side by side, so that the contact is progressive and by the meeting of the broadest sides, permitting the maximum free and open expansion or development of the flame, together with a considerable radiation of heat. The construction is such that, prior to this mixing of the gas and air within the combustion chamber, there can be no possibility of mingling, and no opportunity for the formation of darts of flame, even when the air for combustion is forced by a blower. Means are provided whereby the streams are individually regulable at will, without interruption of the operation of the furnace and without permitting premature mixing of the air and gas, with consequent explosion or formation of darts of flame.

In a specific embodiment of the invention the slit for gas is always placed in front of the slits for the admission of the air, that is, the slits are not in lateral alinement, but overlap each other. Preferably, also, the discharge ends of the slits are in the same plane. Moreover, desirable results may be obtained by making the air and gas passages straight and by inclining the outer end wall of the gas slit downward and inward and the inner end walls of the air slits downward and outward, so that the axes of the flat streams are reversely inclined in parallel planes. For many purposes, also, it is desirable to incline the walls of the air slits laterally toward the intermediate gas slit, so as to cause one or both of the streams of air to converge laterally toward the gas stream. In accordance with the invention, each gas slit is established as the axis of symmetry for two air slits. The slits are thus arranged in groups of three, or other odd number, of which the members are adjacent, but the spacing of which may be varied to greater or less degree in accordance with the particular objects in view. The number of these groups, as well as their distribution along the length of the furnace, is determined by the effect and the temperature to be obtained. The slit for the introduction of gas is in direct communication with the conduit for gas (whether the latter is producer gas, illuminating gas, natural gas or vaporized and inflammable liquids), without possibility of contact of the gas with the air before the entrance of both into the combustion chamber. While each group preferably consists of three slits, a gas slit arranged symmetrically between two air slits, the same alternation and symmetrical arrangement may be preserved with a larger number of slits in each group, providing always that each gas slit is disposed between two air slits in accordance with the principles set forth. Thus, a group of five slits, two gas slits alternating with three air slits, is of essentially the same nature as a three-slit group. Such larger groups are useful in furnaces where the intensity of combustion should be relatively great, with a hearth of limited length but of rather great height.

The invention presents numerous advantages. The fact that any mixture of air and gas is impossible before their entrance into the heating chamber and the very disposition of the parallel slits, insures the impossibility of the formation of darts of flame and the like, even when the air for combustion, instead of being aspirated by natural draft as is usually the case, is forced by a blower. In view of the well-known disastrous effect of such inequalities in combustion upon the refractory crucibles or mufflers in the zinc furnaces, pot furnaces of glass-works, etc., the importance of this feature is readily apparent. The ability to regulate the sections of the air and gas ports, absolutely, independently and instantly, without any interruption whatever to the operation of the furnace, enables variation to be made at will in the proportions of the air and gas, as well as in the height or distance at which the combustion is complete. By variation in the length of the narrow slits and in the spacing of the air slits with reference to the axis of the gas slit, constituting the axis of symmetry, it is possible to augment or reduce one or more of the dimensions of the stream of burning gas in accordance with the particular end in view. The same is evidently true in the case of a combustion apparatus employing more than three slits and in which the axis of symmetry may be constituted by a middle air slit. In any of its forms, the construction makes it possible to obtain the maximum free and open expansion or development of the flame, together with a very considerable radiation of the the heat.

The accompanying drawings illustrate the invention as applied to a double-faced zinc furnace.

Figure 4:
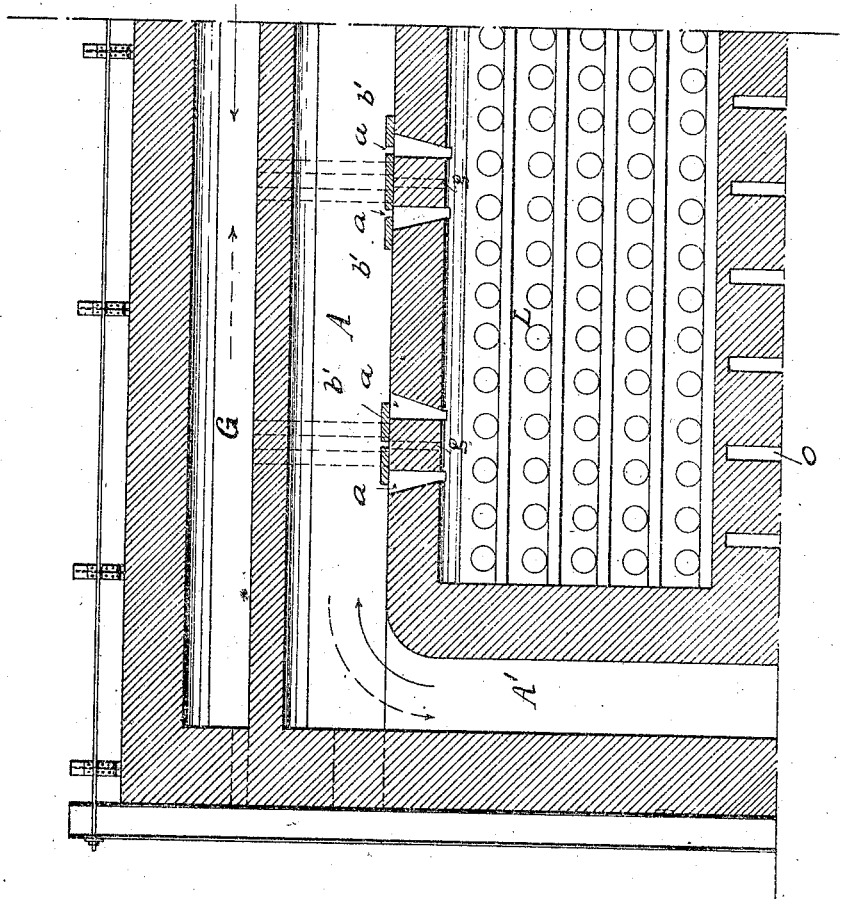

Figure 1 is a transverse vertical section through the two combustion chambers and the ducts thereof, the sections of the two halves of the furnaces being taken in different planes, so that the section at the right cuts an air port while the section at the left cuts a gas port; Fig. 2 is a horizontal section, the two halves being taken on different planes, one cutting through the air duct and the other through the gas duct; Fig. 3 is a vertical longitudinal section through an end portion of the combustion or retort chamber and the ducts thereover, this section cutting the gas ports; Fig. 4 is a similar view, but taken through the air ports and showing a somewhat different construction of the latter, together with means for varying the passage of fluid therethrough; and Fig. 5 is a view showing the same form of ports as Fig. 3, but taken through the air ports and showing but a short length of the furnace.

The retort chambers L at opposite sides of the furnace may be of usual or any preferred construction, and communication between them may be afforded in a suitable manner, as by means of the openings O through the base of the central wall separating the chambers.

A and G represent the air and gas ducts, respectively, of which there are two sets, one set for each side of the furnace. Preferably these ducts are disposed in longitudinal alinement with the combustion or retort chambers, either over or under the same, and in particular I prefer to superpose these ducts, with the gas duct over the air duct. The ducts may communicate at opposite ends with vertical passages through which the gas and air enter from the regenerators, if these are used, and through which, also, the burned gases flow on their way from the combustion chambers. The vertical passage for the air duct is illustrated at A', and the direction of the gas and air in entering are indicated by the solid arrows, while the directions of the outgoing burned gases are indicated by the broken arrows. It will be understood that in such a furnace the gas and air enter through one set of gas and air ducts, thence pass by the ports, presently to be described, into the combustion chamber at one side of the furnace, where they mingle and burn, thence by the openings O to the combustion chamber at the other side of the furnace, from which they pass by the said ports into the other set of gas and air ducts, from which they flow through the regenerators, (not shown), and thence to the stack. Upon reversal the fluids flow in the reverse manner.

In accordance with the invention the gas and air for combustion are introduced into the combustion chamber, without possibility of previous mixing, in the form of thin vertically moving streams or "slices" parallel and sufficiently adjacent to each other for proper combustion. The admission ports are disposed in groups, there being one or more groups for each combustion chamber or side of the furnace, preferably a plurality of groups distributed along each half of the furnace. Each group or combustion unit consists, in the typical instance, of three slit-like ports, a gas port between two air ports. However, a larger number of ports may be included in each group, providing that the air and gas ports alternate, with the air ports in the majority and each gas port between two air ports. Upon the number of ports employed will depend whether the center of a gas port or the center of an air port constitutes the axis of symmetry for the group. These groups of parallel, adjacent, slit-like ports open through the tops or bottoms of the combustion chambers so as to direct the flat streams or "slices" of air and gas in a general vertical direction.

In the drawings the letters $a$ and $g$ represent, respectively, the ports for air and gas opening through the arches of the chambers. Preferably, these ports open into the combustion chamber, as shown, in a common plane so that the streams of air and gas emerge from their ports, not only in parallelism and in the same general direction, but at a common level. In accordance with the best embodiment of the invention the gas and air ports of each group are in staggered relation, and preferably in overlapping relation, the gas port being always outside or in advance of the air ports, as shown in Fig. 2. In addition, the end walls of the gas and air slits are preferably inclined in converging planes, so that while the streams of air and gas may be regarded as traveling in parallel planes, yet their axes may be regarded as having reverse or converging inclinations, the result being that the streams enter the one between the others in an oblique manner, so that the gas stream, which at its base is only partially or slightly included between the air streams, enters more and more therebetween as the streams progress. Thus I procure a gradual and effective mixing of the fluids by virtue of the fact that they travel in flat streams or "slices" substantially parallel to each other, so that the contact or mingling is progressive and by the largest area of the streams. The nature of the mixing and burning is further improved by the overlapping convergence of the streams. The inclination of the end walls of the gas and air ports is illustrated in Fig. 1, where both end walls of the gas port are shown inclined and the rear end wall of the air port is also shown inclined.

In the particular construction illustrated the air ports $a$ are formed by openings through the arches of the retort chambers connecting the latter with the air ducts A. The gas ports $g$ are shown as forming continuations of downtake passages $g'$ extending from the gas ducts G through the air ducts A, but with the interiors cut off from all communication with the latter. In the particular construction illustrated, the gas ports $g$ are shorter from end wall to end wall than the down-take passages $g'$. Preferably, also, the gas ports are considerably shorter in this horizontal direction than the air ports.

It is a feature of my invention that the passage of fluid through the air and gas ports may be instantly regulated, independently of each other and without in any manner affecting the running of the furnace. To this end I provide openings $pa$ and $pg$ through the outer walls of the furnace, which openings communicate with the passages that lead the gas and air downward to the retort chambers, so that through these openings the flow of fluid to the chambers may be regulated, as to volume or direction or both, by suitable means. In Figs. 1 and 2 I have illustrated refractory balls $b$ as suitable means for partially obstructing these slits. These balls may be manipulated by a rod or the like $r$. It will be understood that these control openings are normally closed by means of a brick or other suitable closure. I have illustrated the openings $pa$ as at the level of the bottom of the air ducts A, so that the balls $b$ or the like are slid over the bottom of these ducts onto the slits $a$. The openings $pg$ may be formed either at the level of the bottom of the gas duct G or the bottom of the air duct A, as shown at the left of Fig. 1. An opening may be employed at one or other of these points, or both openings may be utilized. The openings $pa$ and $pg$ also serve for purposes of cleaning. As shown in Fig. 4, one or both of the side walls of each air slit $a$ may be more or less inclined toward the intermediate gas slit, so that the air streams may be caused to converge more or less in a lateral manner toward the gas stream. In certain instances, such convergence is of material advantage. The degree of such convergence, as well as the amount of the fuel admitted, may be regulated by any suitable means manipulated through the openings $pa$, as for instance the refractory bricks or plates $b'$, which may be moved about as desired. Thus, the air streams may be caused to converge laterally toward the gas stream or not, according to necessity. The furnace may be provided with other openings for access in cleaning, as indicated at P and $p$.

It is believed that the operation of the invention has been made clear during the progress of the foregoing description.

It will be understood that while certain particular embodiments of the invention have been particularly described, numerous changes may be made without departing from the invention in its broader aspects.

What I claim as new is:

1. In a gas furnace, in combination with a retort chamber having retorts uniformly distributed throughout the chamber, means, including air and gas passages with separate, narrow, adjacent and vertically directed slit mouths, for causing the air and gas streams to enter the retort chamber in thin adjacent layers so that all particles of air and gas move vertically and downwardly in one general direction into the retort chamber without preliminary mixing before entering said chamber, said slit mouths being arranged in groups with each gas slit between the mouths of two air slits and in substantially the same plane, substantially as and for the purpose set forth.

2. In a gas furnace having a retort chamber, means, including air and gas passages with separate, narrow, adjacent, independent and vertically directed slit mouths, for causing the air and gas streams to enter the retort chamber in thin adjacent layers so that all particles of air and gas move vertically in one general direction into the retort chamber without preliminary mixing before entering said chamber, substantially as and for the purpose set forth.

3. In a gas furnace having a combustion chamber, means for admitting air and gas thereto and producing mixing thereof, said means including a group of separate narrow parallel adjacent vertical slits for the air and gas, each gas slit being arranged between two air slits, and each air slit having one or both side walls inclined toward the gas slit, together with means whereby the direction of the narrow streams emerging from said air slits may be slightly varied laterally.

4. In a gas furnace having a combustion chamber, the means of introducing gas and air including separate superposed air and gas ducts in vertical alinement with the combustion chamber, the nearer duct communicating with the combustion chamber by means of vertical narrow slit openings, and the other duct also communicating with the chamber by means of vertical gas-tight narrow flues through the nearer duct terminating in narrow slit-mouths, the slits being arranged in groups in which the air and gas slits alternate, with the air slits in the majority, the slits of each group being adjacent and parallel to each other, the whole substantially as described.

5. In a gas furnace having a combustion chamber, separate narrow slits vertical and parallel, side by side for leading respectively air and gas to the combustion chamber and communicating respectively with superposed and separate air and gas ducts, of which the walls are provided with apertures communicating with said vertical slits, and means whereby the longitudinal or transverse dimension of the openings may be readily varied independently of each other so as to converge the air and gas streams laterally, substantially as set forth.

6. In a gas furnace having a combustion chamber, means for supplying air and gas thereto and producing gradual mixing of the gaseous fluids, said means including air and gas passages with separate narrow adjacent slit-like ports arranged to cause the air and gas to enter the combustion chamber in thin vertically directed streams traveling and mingling side by side, the slit-like ports being arranged with each gas port between two air ports but offset therefrom.

7. In a gas furnace having a combustion chamber, means for supplying air and gas thereto and producing gradual mixing of the air and gas, said means including air and gas passages with separate narrow adjacent slit-like ports arranged to cause the air and gas to enter the combustion chamber in thin vertically directed streams traveling and mingling side by side, the slit-like air and gas ports alternating in staggered relation with their end walls inclined in converging planes.

8. A gas furnace having a combustion chamber and means, including air and gas passages with separate, narrow, adjacent and vertically directed slit-like ports, for causing the air and gas streams to enter the combustion chamber in thin adjacent layers so that all particles of air and gas move vertically in one general direction into the combustion chamber without preliminary mixing before entering said chamber, the slit-like air and gas ports being in parallel staggered relation.

9. A gas furnace having a combustion chamber and means, including straight air and gas passages with separate, narrow, adjacent and vertically directed slit-like ports, for causing the air and gas streams to enter the combustion chamber in thin adjacent layers so that all particles of air and gas move vertically and downwardly in one general direction into the combustion chamber without preliminary mixing before entering said chamber, the slit-like air and gas ports being arranged with each gas port between two air ports.

10. In a gas furnace, the combination of a chamber to receive the articles to be heated, and means for causing the air and gas streams to enter the chamber of the furnace in thin adjacent layers so that all particles of air and gas move vertically in one general direction, into the furnace chamber without preliminary mixing before entering said chamber.

In testimony whereof, I have signed my name to this specification, in the presence of two subscribing witnesses.

ALEXANDRE FOLLIET.

Witnesses:
CHARLES A. JOHNSON,
EMILE VAN WANSELLE.